W. HANDLEY.
ELECTRIC CONDUIT.
APPLICATION FILED JAN. 13, 1915.
1,296,952.
Patented Mar. 11, 1919.
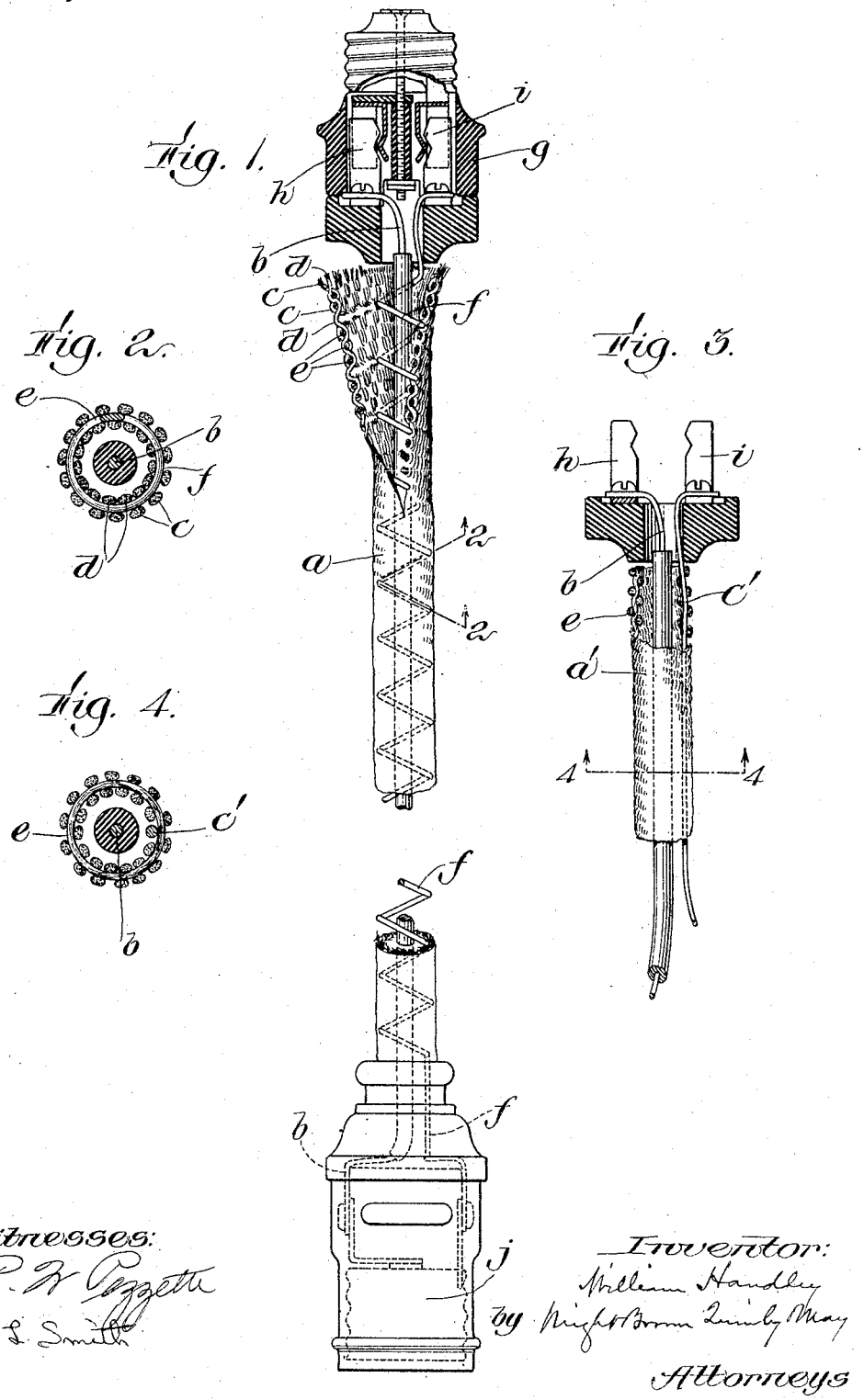

UNITED STATES PATENT OFFICE.

WILLIAM HANDLEY, OF PROVIDENCE, RHODE ISLAND, ASSIGNOR TO TUBULAR WOVEN FABRIC COMPANY, OF PAWTUCKET, RHODE ISLAND, A CORPORATION OF RHODE ISLAND.

ELECTRIC CONDUIT.

1,296,952.      Specification of Letters Patent.      Patented Mar. 11, 1919.

Application filed January 13, 1915. Serial No. 2,055.

*To all whom it may concern:*

Be it known that I, WILLIAM HANDLEY, a citizen of the United States, and resident of Providence, in the county of Providence and State of Rhode Island, have invented certain new and useful Improvements in Electric Conduits, of which the following is a specification.

The present invention relates to conduits for containing and protecting the electrical conductors used in wiring buildings, and for other purposes; and has for its object to provide a conduit capable, not only of serving the purposes for which such conduits are ordinarily employed, but also of constituting a part of the electrical circuit of which the contained conductor is also a part, whereby to reduce the cost and bulk of the installation in which the conduit is used. The invention consists first, in a conduit adapted to receive a wire or other conductor of electricity and having one or more electrical conductors incorporated in its structure, preferably, although not necessarily, in such a way as to be insulated by the other elements of the conduit structure; second, in the combination of which the conduit forms a part; and third, in the particular features of the conduit hereinafter described and claimed.

In the drawings forming a part of this application,

Figure 1 is an elevation, with parts broken away and in section, illustrating one form of conduit embodying my invention, in combination with the contained electrical conductor and the connections by which the conductor of the conduit structure is put in circuit with the contained conductor.

Fig. 2 is a cross section of the conduit and contained conductor taken on line 2—2 of Fig. 1.

Fig. 3 is a part elevation and part section showing a modified form of the conduit in combination with the contained electrical conductor.

Fig. 4 is a cross section taken on line 4—4 of Fig. 3.

In the drawings $a$ represents the conduit, which is here shown as being of seamless tubular fabric construction, and $b$ represents an insulated conductor of electricity which is contained in the conduit, and of which the external diameter is enough smaller than the internal diameter of the conduit to enable the conductor to be readily moved endwise within the conduit.

The form of conduit shown in Figs. 1 and 2 is of woven construction composed of longitudinal warp strands $c$ and $d$ and helical weft strands $e$, $e$, and $f$, the weft strand $f$ being of electrically conductive material and preferably, although not necessarily, in the form of a wire. The warp strands $c$ and $d$ and the weft strands $e$ may be of any material suitable for the purpose, and may be either electrically conductive or non-conductive according to the particular conditions for which the conduit is designed. For some purposes it is advisable to have the warp strands of non-conducting material, for such strands then insulate the conductor weft strand $f$ by passing alternately inside and outside of the turns of such strand and substantially covering the same. The weft strands $e$, of which three are shown, may be fewer or more numerous, or may be omitted altogether, according to circumstances. Ordinarily it is desirable in the interests of economy to provide a number of non-metallic weft strands of inexpensive material running alongside and parallel to the conductor weft for the double purpose of reducing the necessary length of the conductor weft and enabling the conduit to be more rapidly manufactured than if the conductor $f$ were the only weft strand provided.

The complete conduit is preferably impregnated or treated, as usual, with suitable water-proofing and fire-proofing substances, of which any of such substances now used, or any other suitable for the purpose, may be employed without affecting the present invention.

A conduit made as above described, and as illustrated in Figs. 1 and 2, possesses the characteristics and serves the purposes of the heretofore used conduits for electrical purposes, being adapted for installation in buildings and elsewhere, and having a passage so large that a conductor wire may be drawn through it, and in addition it serves the purpose of a conductor of electricity by comprising in its construction the conductor member $f$, which runs continuously from end to end of the conduit, whatever the length of the conduit may be, and is accessible at both ends so that by cutting away a portion of the conduit at the ends thereof, a sufficient length of the conductor may be exposed to be used in making electrical connections.

In Fig. 1 is shown the application of a conduit embodying my invention to the uses of containing and protecting an electrical conductor and also of serving as part of the circuit in which the conductor is also a part, the specific circuit being an electric light connection. At one end of the conduit is shown a plug switch $g$ having contact terminals $h$ and $i$, to one of which the contained conductor $b$ is connected, and to the other of which the conductor $f$ of the conduit structure is connected. At the opposite end of the conduit is shown a lamp socket $j$, to the terminals of which the contained conductor $b$ and the conductor $f$ of the conduit structure are respectively connected, as shown in dotted lines.

In Figs. 3 and 4 is shown a conduit $a'$ made as a tubular woven fabric in which one of the warp strands, as $c'$, is an electrical conductor. The contained conductor $b$ and the conductor warp $c'$ are shown as connected to the poles $h$ and $i$ of a plug switch.

It will be evident that the use of the conduit above described, which contains in its own structure one of the wires of an electrical circuit, enables one conduit to perform the service for which two conduits, as heretofore employed, would be required in many cases, and permits in other cases the use of a smaller and less costly conduit; and that it also enables one of the insulated conductors heretofore required in electrical installations to be dispensed with, thus enabling large economies in the installation of electrical wiring and the like to be effected.

I have not attempted to describe all the forms and constructions of conduit in which my invention may be embodied, or all the possible modes of its use, and I do not intend the foregoing description and the associated illustration to be considered as limiting the invention to the forms and applications described and shown. The conduit structure may include more than one conductor as a component element if it is desired, and such conductor or conductors may be incorporated in the conduit structure by braiding as well as by weaving; or it may be otherwise tied to, or interlocked or bonded with, the other component elements of the conduit structure than by braiding or weaving. The terms "interbonded," "interconnected," "interlocked," and "interengaged," used in the following claims are intended to cover the condition in which a conductor is connected with or incorporated in the conduit structure, whatever may be the means by which that condition is brought about.

While I have illustrated and referred to the conductor $b$ as an insulated conductor it should be noted that the conduit hereinbefore described is not limited to use in connection with such a conductor, but that on the other hand the inclosed, or contained conductor, may as well be bare as insulated. When a bare conductor is used the non-conducting warp strands of the conduit structure together with such compound or substances as may be provided to make the conduit waterproof or fireproof and which also have insulating properties, separate and insulate the contained conductor from the conductor which is incorporated in such structure. Also the wire or other conductor which is used as the conducting weft $f$ or the conducting warp $c'$ of the conduit structure may be either bare or insulated (by means additional to the insulation provided by the coöperating elements of the conduit structure, as occasion may require.

The hereinbefore described conduit containing a conductor in its construction and having other elements of non-conducting material interengaged with the said conductor, forms a protecting jacket for the contained conductor and forms also an insulated conductor adapted to be made part of the circuit of which the contained conductor is a part.

What I claim and desire to secure by Letters Patent is:

1. A conduit for electric conductors comprising a tubular body open from end to end and adapted to contain removably such a conductor, constructed of interengaged strands, one or more of such strands being a conductor of electricity adapted to be connected in an electrical circuit, and the other strands being of non-conducting material enveloping and insulating said conducting strand or strands.

2. A conduit for electric conductors comprising in its construction a conductor of electricity, and a plurality of coöperating structural elements of non-conducting material arranged respectively alongside of, and crossing, said conductor, and thereby insulating the same, and being so engaged with one another and with the conductor as to constitute a tubular fabric open from end to end and adapted, in its completed condition, to admit an electric conductor.

3. A conduit adapted to admit removably electric conductors comprising in its construction a conductor of electricity, and a plurality of coöperating structural elements of non-conducting material some of which extend beside and along the conductor, and others of which extend across the inner and outer sides of the conductor in such manner as to form a tubular fabric and substantially cover and insulate the conductor.

4. The combination with a conduit constructed of a plurality of interconnected elements, one of which is an electrical conductor extending throughout the length of the conduit and exposed at the ends thereof, and others of which are non-conductors respectively on each side of, and interwoven with, said conductor and insulating the same, of a wire or other conductor of electricity contained movably within said conduit and connected in the same circuit with the said conductive element of the conduit structure.

5. A tube having an open interior adapted to permit longitudinal insertion of an electrical conductor, and constructed of longitudinal warp strands and helical weft strands interwoven with one another, certain of said strands being electrical conductors while the strands which are interwoven therewith are non-conductors, said conducting strand forming one part of an electric circuit of which the inserted conductor forms another part.

6. A tube composed of conducting and non-conducting weft strands coiled in coaxial helices of the same diameter with the turns of said strands alternating with one another, and non-conducting warp strands interwoven with the turns of said weft strands; the interior of said tube being open and adapted to permit insertion of an electrical conductor, said conductor and the conducting weft strand forming parts of the electric circuit.

In testimony whereof I have affixed my signature, in presence of two witnesses.

WILLIAM HANDLEY.

Witnesses:
Jos. A. Kennedy,
D. M. Watrous.

Copies of this patent may be obtained for five cents each, by addressing the "Commissioner of Patents, Washington, D. C."